United States Patent [19]

Manners

[11] 4,267,492

[45] May 12, 1981

[54] CONTROL CIRCUIT FOR A D.C. MOTOR

[75] Inventor: Frank Manners, Lightwater, England

[73] Assignee: Lansing Bagnall Limited, Basingstoke, England

[21] Appl. No.: 956,046

[22] Filed: Oct. 31, 1978

[30] Foreign Application Priority Data

Nov. 3, 1977 [GB] United Kingdom ............... 45818/77
May 31, 1978 [GB] United Kingdom ............... 45818/78

[51] Int. Cl.³ .............................................. H02P 3/14
[52] U.S. Cl. ................................... 318/376; 318/258; 318/379; 318/139
[58] Field of Search ............... 318/293, 294, 295, 258, 318/376, 379, 139

[56] References Cited

U.S. PATENT DOCUMENTS

| 3,504,257 | 3/1970 | Smith | 318/258 |
|---|---|---|---|
| 3,566,227 | 2/1971 | Edhlund | 318/258 |
| 3,924,168 | 12/1975 | Woodward | 318/294 |
| 3,944,898 | 3/1976 | Wright | 318/376 |
| 4,074,175 | 2/1978 | Born et al. | 318/432 |
| 4,084,119 | 4/1978 | Kato et al. | 318/434 |
| 4,145,640 | 3/1979 | Kipp et al. | 318/139 |

*Primary Examiner*—David Smith, Jr.
*Attorney, Agent, or Firm*—Cushman, Darby & Cushman

[57] ABSTRACT

A direct current motor control circuit in which the armature is arranged for reversible connection in a main path for current to flow from a first supply terminal to a second supply terminal through the armature and a current chopper. A pair of switches between which the armature is connected are controllable to effect this reversible connection in the drive mode and to connect the armature across a bridge to permit return current to flow from the second terminal, in either direction through the armature toward the chopper in a regenerative mode, one or more diodes being provided for completing a return path for the return current to flow to the first terminal.

14 Claims, 3 Drawing Figures

CONTROL CIRCUIT FOR A D.C. MOTOR

This invention relates to control circuits for direct current motors.

One aspect of the invention concerns a circuit which provides reversible drive and regenerative braking of a pulse controlled direct current motor by means of a switching arrangement for selecting the direction of armature current in the drive mode, and for connecting the armature in a rectifier bridge in the regenerative mode.

According to this aspect of the invention there is provided a direct current motor control circuit in which the armature is arranged for reversible connection in a main path for current to flow from a first supply terminal to a second supply terminal through the armature and a current chopper, and in which switch means are arranged for selectively connecting the armature across a bridge to permit current to flow from the second terminal, in either direction through the armature toward the chopper, and means completing a return path for the latter current to flow to the first terminal.

Preferably the switch means comprise a pair of switches, between which the armature is connected and which are controllable to effect said reversible connection.

The aforementioned features facilitate the provision of bidirectional drive and regenerative braking, permitting the motor to be readily switched from a driving mode to a regenerative braking mode, in which the armature moves in the same direction as in the previous driving mode, merely by operation of the aforementioned switch means.

In one embodiment of the invention a field winding of the motor is connected in the main path between the chopper and the bridge. Additionally, or alternatively a field winding may be connected between the first terminal and a point on the main path between the chopper and the bridge. The provision of this field winding helps to avoid reliance on residual magnetism in the circuit to start current regeneration when the motor is switched into its regenerative braking condition.

Normally the supply terminals would be the terminals of a storage battery which is connected to supply electrical energy to the motor and its control circuits.

The bridge may comprise a first pair of diodes each connected between the second terminal and a respective side of the armature with polarity for conduction toward the armature, and a second pair of diodes, each arranged to be connected, by a respective one of said switches constituting the switch means, between a respective side of the armature and a point of connection in the main path, in the regenerative braking mode.

The means completing the return path may include a further pair of diodes, each connected between a respective side of the armature and the first terminal, or a diode connected between the aforesaid point of connection and the first terminal, these means also providing a freewheel path for armature current when the chopper is non-conductive. A freewheel path for field current is preferably also provided.

Another aspect of the invention concerns a circuit which provides separate excitation of the armature and field of a pulse controlled direct current motor, whilst arranging that in certain operational modes both armatures and field current flows through the same current chopper.

According to this aspect of the invention there is provided a control circuit for a direct current motor in which the armature is arranged to conduct armature current flowing along a main path from a first terminal to a second terminal through a current chopper, and in which there is provided a freewheel loop including the armature but excluding the chopper around which armature current can flow during periods when the chopper is non-conductive, and a field winding is arranged in a branch connected to the main path for field current to flow from the first terminal to the second terminal through a controllable rectifier the said winding and the chopper, wherein there are provided control means for supplying gating signals to the chopper and the controllable rectifier, and means responsive to the flow of current in the freewheel loop to terminate conduction of the said rectifier.

Preferably the controllable rectifier is a thyristor coupled to receive trigger pulses from the control means to initiate conduction thereof, the arrangement being such that upon termination of the conduction of the chopper, conduction of armature current in the loop establishes a bias voltage, derived from the forward voltage drop in a freewheeling diode, connected in the freewheeling loop which bias voltage is applied to the branch to terminate the conduction of the thyristor. Such an arrangement avoids the necessity for a separate electrical commutating assembly to apply a suitable bias to extinguish the thyristor at the time that the chopper ceases conduction.

Reference will hereinafter be made to the accompanying drawings in which.

In the drawings, like reference numerals are employed in the three figures to indicate corresponding elements.

Figure 1:
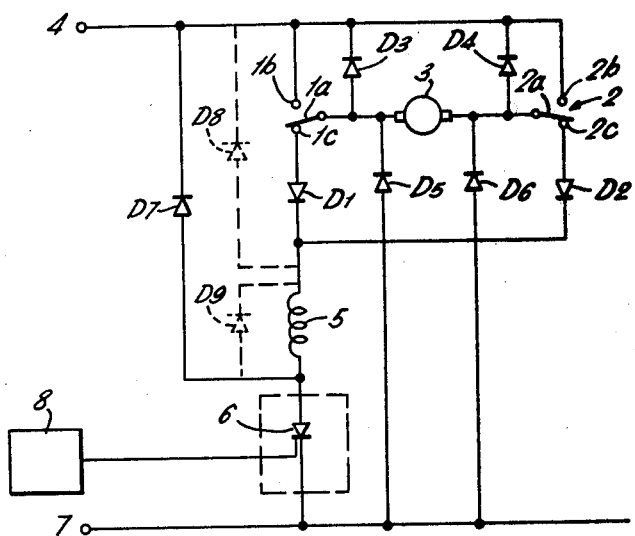
FIG. 1 illustrates one form of circuit according to the invention for controlling a series motor.

In the circuit shown in FIG. 1, a pair of switches 1, 2 are connected to couple the armature 3 reversibly between a positive terminal 4 of a D.C. source, conveniently a battery, and one end of a series field winding 5, the other end of which is connected by an electronic switch 6, constituting a current chopper to the negative terminal 7. The electronic switch 6, is conveniently a thyristor or other solid-state controllable rectifier. The arms 1a, 2a of the switches 1 and 2 are connected to the opposite poles of the armature 3, and are each movable for selectively contacting one of a respective pair of contacts 1b, 1c or 2b, 2c, the contacts 1b and 2b being connected to the positive terminal, while between the contacts 1c, 2c and the field winding 5 are connected respective diodes D1, D2. Two freewheel diodes D3, D4 are connected between the respective armature poles and the positive terminal 4. These diodes are arranged to allow current to flow through the armature around respective freewheel loops when the switch 6 is not conductive.

A diode D7 is connected between the point of connection of the field winding 5 and the switch 6 and the positive terminal 4 to allow current to flow through the field winding when the switch 6 is open.

Two further diodes D5 and D6 are connected between the negative terminal 7 and respective sides of the armature with polarity so as to allow the passage of current from the negative terminal 7 to the armature and thence through diodes D4 or D3 respectively when switch 6 is non-conductive in the regenerative braking mode.

This circuit may be modified by replacing the freewheel diodes D3 and D4 by a single freewheel diode D8 connected between the point of connection of the diodes D1 and D2 and the field winding 5, and the positive terminal 4, and by replacing the diode D7 by an alternative diode D9 connected across the field winding 5.

Firing pulses for the switch 6 may be provided by a pulse control circuit 8 which is relatively simple to construct and does not warrant particular description. This control circuit may also supply firing pulses for an auxiliary thyristor switch coupled in a commutating fashion with switch 6 to provide full control over the state of conduction of the latter.

Driving of the motor requires connection of one armature pole to the positive terminal and the other to the field winding. For one direction, call this the forward direction, this is achieved by arm 1a contacting contact 1b, and arm 2a contacting contact 2c, to establish a series path for current to flow, when switch 6 conducts, from the positive terminal through switch 1, armature 3, switch 2, diode D2, field winding 5, switch 6 to the negative terminal. For the opposite direction of drive, namely the reverse direction, the arm 1a contacts contact 1c and arm 2a contacts contact 2b, the series path from positive to negative terminal comprising switch 2, armature 3, switch 1, diode D1, field winding 5 and switch 6. Thus reversal of drive direction is achieved by reversal of the armature current for unidirectional field current. During motor drive the operation of the switch 6 will be regulated by the control circuit 8, which will normally respond to means for sensing the armature current to maintain a proper armature current. As mentioned before, when the switch 6 is non-conductive motor current circulates through the armature and field windings through freewheel diode D7, or in the alternative arrangement the armature current circulates through diode D8 while the field current circulates through diode D9.

If, whilst the armature is turning in one direction, whether in a drive or braking mode, switches 1, 2 are placed in condition for drive in the opposite direction, the diode D3, or D4 (dependent upon whether the change is from forward to reverse or reverse to forward armature rotation, respectively), being in shunt with the armature, limits the voltage across the armature to the forward diode voltage drop, thereby ensuring that the current flowing in the field winding decays to prevent an unstable series generator being established. In the alternative arrangement the armature is shunted by the series connection of diode D8 and either D1 or D2 to achieve a similar voltage limitation.

When regenerative braking is desired, in the forward direction, the switch arms 1a, 2a are moved to contact the respective contacts 1c, 2c as shown in FIG. 1 to provide a current path from the terminal 7 through the diode D6, the armature 3, the switch 1, diode D1 and thence back to the negative terminal 7 through the field winding 5 and switch 6. Diode D2 prevents the current from flowing back towards the armature. Current is driven round this path by the electromotive force generated by the motor, whose armature is still turning in the same sense as it has been during driving. The armature current is limited by the action of control circuit 8. When this circuit terminates the conduction of switch 6, the motor continues to generate current which now flows from the terminal 7, through diode D6, the armature 3 and thence back to the positive terminal 4 through the diode D3 and through the winding 5 and the diode D7.

Regenerative braking in the reverse direction involves the same switching operation, but in this case, the regenerative current flows from the negative to the positive terminal through diode D5 and armature 3 and thence through diode D4 and through diode D2, field winding 5 and diode D7, with diode D1 performing an analogous function to diode D2 as mentioned above for the forward braking mode.

It will be seen that, in the regenerative braking mode, the armature 3 is in effect connected across a diode bridge constituted by the diodes D1, D2, D5, D6, for permitting the regenerative current, whichever way it may flow through the armature, to pass from the negative terminal toward the switch 6. The switches 1 and 2 constitute a switching arrangement for selectively connecting the armature into this bridge and into a main path for current to flow from the positive supply terminal to the negative supply terminal through the armature and the chopper switch 6.

Figure 2:
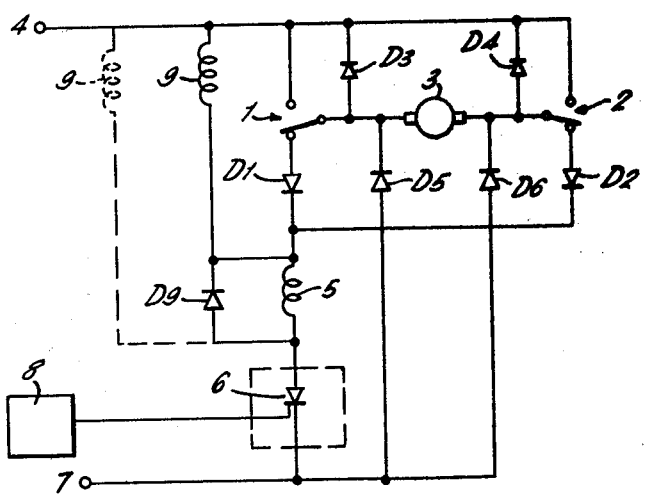
FIG. 2 illustrates another form of circuit according to the invention for controlling a compound motor.

In FIG. 2, a circuit for controlling a compound motor in both drive and regenerative modes for both directions of armature rotation includes a switching arrangement 1, 2 and diode bridge and armature freewheel diode arrangement D1 to D6, series field 5 and chopper 6 as in the FIG. 1 circuit. The circuit as illustrated includes the alternative series field shunt freewheel diode D9, through a diode connected as diode D7 of FIG. 1 would have a similar effect to avoid sudden changes in the series field current. A shunt field winding 9 is connected between the positive terminal 4 and the point of connection of the diodes D1 and D2 and the series field winding 5. During driving the shunt field current also flows through the series field and is thus regulated by the control unit 8 and chopper 6 as before. However, whereas the FIG. 1 circuit depended entirely upon series field remnance for regenerative braking to be started, thereby preventing regenerative braking below a critical motor speed, the presence of the shunt field permits such braking to be initiated at a much lower speed, though the motor will require five or six supply cables, each of which will be somewhat bulky where the motor is of relatively large power as in an electrically powered vehicle. As shown in broken lines in this Figure, the shunt winding 9 may be connected to the other side of the winding 5. Although with this arrangement the shunt field current would not flow through the series field, such shunt field provides the same advantage as when connected in the full-line position.

Figure 3:
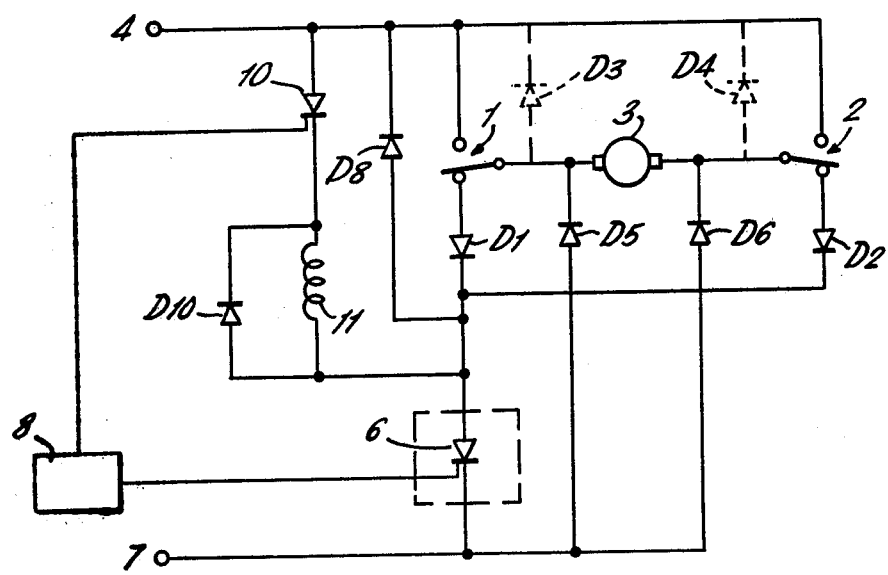
FIG. 3 illustrates a still further form of circuit according to the invention for controlling a separately excited motor.

FIG. 3 illustrates a circuit for a separately excited motor and includes the alternative single freewheel diode D8, though the two diodes D3, D4 may, as indicated in dashed lines, be employed. A further switch 10, conveniently another thyristor, is connected in a branch to regulate the current flow in the branch from the positive terminal 4 to the switch 6 through the field winding 11. A freewheel diode D10 permits current to circulate in the winding 11 when it is disconnected by switches 6 and 10 from the power supply. Firing pulses for switch 10 are also supplied from the pulse control circuit 8.

For efficient control it is desirable that switches 6 and 10 open or close substantially simultaneously in both driving and regenerative braking modes. Simultaneous closure is simply achieved by applying firing pulses from control circuit 8 simultaneously to the two switches, in which case a commutation circuit may be provided to permit the termination of the conduction of switch 10 prior to that of switch 6, in order to provide full control of field energisation.

The firing of these switches might alternatively be independently controlled, in which case the aforementioned commutation circuit may not be necessary since the inductive effect of the armature 3 when switch 6 opens may well cause an appropriate bias to be applied across thyristor 10 to cause its conduction to cease. For example, when, during forward drive the chopper 6 opens and armature current flows around the freewheel loop provided by diode D8, the potential at the point of connection of the winding 11 to the chopper is greater than the positive battery potential by an amount corresponding to the forward voltage drop across diode D8. The freewheel diode D10 which, after the opening of chopper 6 conducts circulating field current, imposes a fixed voltage across the winding corresponding to its own forward voltage drop. If the forward voltage drop across diode D10 is equal to that across diode D8, the potential at the cathode of thyristor 10 is equal to the positive battery potential. Thus, since at least a predetermined forward voltage across a thyristor is required to maintain conduction, the thyristor 10 will cease conducting.

This shunt motor circuit possesses the advantages of both the FIG. 1 and FIG. 2 circuits, while avoiding the necessity for excessively bulky supply cables, and the shunt field advantageously imposes a speed limitation on the armature rotation.

The method of operating the FIGS. 2 and 3 circuits for forward and reverse drive and regenerative braking by the simple operation of the mechanically actuated switches 1, 2 and the electronic switch 6 (and switch 10 in FIG. 3) is analogous to the operation of the FIG. 1 circuit described in detail earlier herein.

I claim:

1. A direct current motor control circuit in which the armature is arranged for reversible connection in a main path for current to flow, in a drive mode of the circuit, from a first supply terminal to a second supply terminal through the armature and a current chopper, and in which switch means are provided for selectively switching the control circuit from said drive mode to a regenerative mode in which the armature is connected across a rectifier bridge to permit return current to flow from the second terminal, in either direction through the armature toward the chopper, means being provided for completing a return path for the return current to flow to the first terminal.

2. A circuit according to claim 1 wherein the switch means are also selectively operable to provide said reversible connection of the armature in the main path.

3. A circuit according to claim 2, wherein the switch means comprise a pair of switches, between which the armature is connected.

4. A circuit according to claim 1, 2 or 3 wherein the bridge comprises first and second pairs of diodes and wherein said switch means are operative to connect the armature across the bridge with the diodes of the first pair connected to conduct current from the second terminal to respective sides of the armature and with the diodes of the second pair connected to conduct current from said respective sides of the armature toward the chopper.

5. A circuit according to claim 4 wherein said switch means comprise a pair of switches of which each is arranged for selectively connecting a respective side of said armature to the first terminal or to the respective diode of said second pair.

6. A circuit according to claim 1 wherein said means for completing a return path comprise at least one return diode arranged to conduct the return current from the armature to the first terminal.

7. A circuit according to claim 6 wherein said means for completing are arranged to provide at least one freewheeling loop, including the armature but excluding the chopper, around which armature current can flow when the chopper is non-conductive.

8. A circuit according to claim 6 or claim 7 including a single return diode connected between the first terminal and a point between the bridge and the chopper.

9. A circuit according to claim 6 or claim 7 including a pair of return diodes, each connected between the first terminal and a respective side of the armature.

10. A circuit according to claim 1 wherein a series field winding of the motor is connected in said main path.

11. A circuit according to claim 10 including a freewheeling diode connected in a loop including the series field winding but excluding the chopper, around which field current can flow when the chopper is non-conductive.

12. A circuit according to claim 1 wherein a shunt field winding of the motor is arranged between the first terminal and the chopper to be connected in parallel with the armature.

13. A circuit according to claim 12 wherein a series field winding of the motor is connected in said main path and is connected so as to conduct the shunt field current.

14. A circuit according to claim 12 wherein said shunt field winding is arranged in a shunt branch which includes a controllable switch and which is coupled between said first terminal and the main path for shunt field current to flow from said first to said second terminal through said branch and said chopper.

* * * * *